Oct. 6, 1959 A. R. WILLIAMS 2,907,607
BRAKE CONTROL SYSTEM
Filed Dec. 7, 1955 2 Sheets-Sheet 1
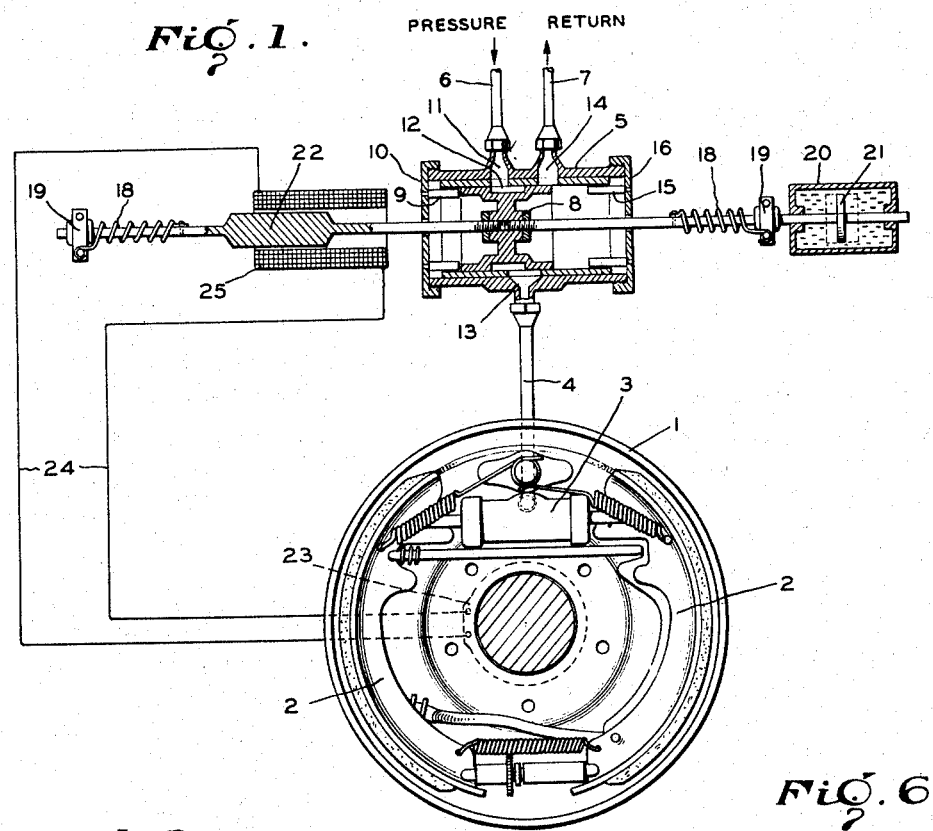
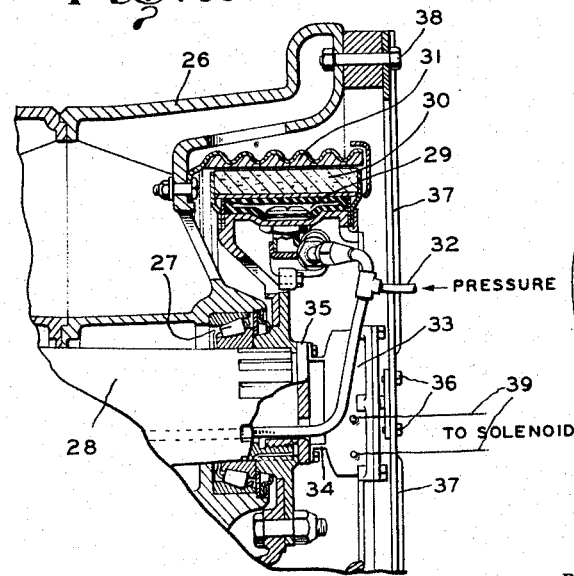
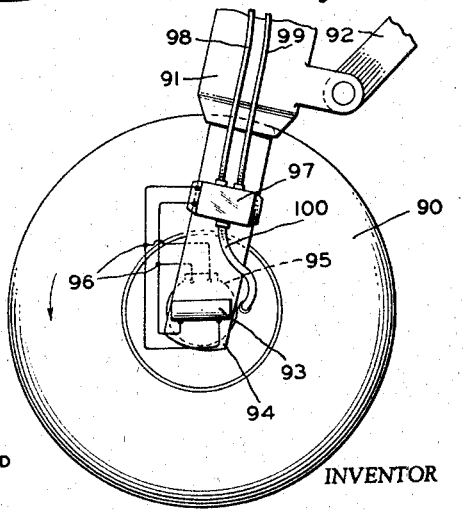
INVENTOR
Allison R. Williams.
BY Cameron, Kerkam & Sutton
ATTORNEYS

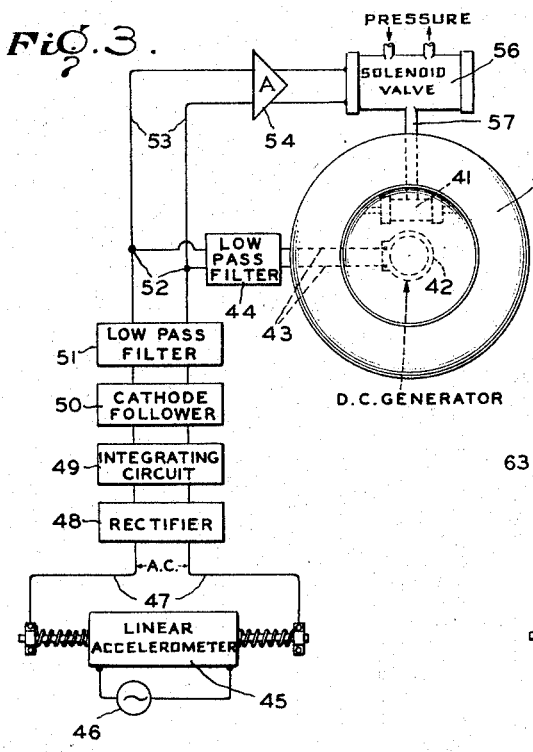

United States Patent Office

2,907,607
Patented Oct. 6, 1959

2,907,607

BRAKE CONTROL SYSTEM

Allison R. Williams, Vicksburg, Miss.

Application December 7, 1955, Serial No. 551,675

3 Claims. (Cl. 303—21)

This invention relates to improved means for controlling the acceleration or deceleration of a rotating body in response to an absolute value comparison of the actual angular acceleration or deceleration of the body with a standard of reference acceleration or deceleration that it is desired to provide.

More particularly, the invention relates to improvements in brake control means such as disclosed and claimed in my prior Patent No. 2,529,985, granted November 14, 1950. As disclosed in that patent, brake control means of the type in question may be used to advantage in connection with various types of rotating bodies, but they are especially useful in connection with wheeled vehicles, such as automotive vehicles, railway cars, airplanes, and the like. For convenience of description, therefore, the invention of said prior patent was illustrated by a railway car brake control means, and the present invention will be illustrated by reference to a brake control system for the landing wheels of aircraft, but it will be understood that the present invention is in no way restricted to this embodiment.

In the case of any such moving vehicle, application of the brakes results in a deceleration of the forward movement of the vehicle, which will be referred to hereinafter as linear deceleration, and a consequent loss of linear velocity, and this linear deceleration can be used as a standard of reference for the comparison referred to above. When the vehicle body and its wheels are so connected that no relative linear movement takes place between them, the wheels will of course have the same linear deceleration as the vehicle body. In some cases, however, as in the case of aircraft where the landing gear struts are in effect vertical cantilever beams, or where the wheel suspension is resilient or somewhat flexible, the wheel may have linear movement relative to the body due for example to rearward deflection of the struts on landing or yielding of the resilient suspension. Under such circumstances the actual linear deceleration of the wheel differs from that of the vehicle body and should be used as the standard of reference. Hence the linear deceleration of the wheel itself will be referred to hereinafter as the standard of reference, although it will be understood that the deceleration of the vehicle body may be used when it is the same as that of the wheel.

Assuming that the vehicle wheel maintains the ideal conditions of complete rolling contact with the supporting surface without slippage, the linear deceleration and loss of linear velocity of the wheel must be accompanied by corresponding and directly proportional angular deceleration and loss of angular velocity of the wheel. Thus it will be seen that the linear deceleration or the resultant decrease in forward velocity of the wheel provides an accurate standard of reference against which the actual angular deceleration or loss of angular velocity of the wheel can be compared to determine how closely its actual performance approaches the ideal.

Differences that appear between the absolute values so compared can also be utilized through suitable mechanical and/or electrical means to control the brakes on the wheel or wheels in question so as to minimize departures of performance from the desired conditions of operation. Comparison of deceleration, i.e., rates of change of velocity, may afford a more sensitive and quicker control in view of the fact that an appreciable period of time may be required for the actual velocity of a decelerating wheel to change materially, whereas the rate of change of velocity may be very high at the instant deceleration begins. In many cases, however, velocities rather than decelerations may be compared as described hereinafter. In any event the direct measurement of linear deceleration of the wheel is always the origin of the standard of reference.

Thus whichever comparison is employed, the standard of reference for the comparison is always a function of the linear deceleration of the wheel, i.e., whether the final force is proportional directly to linear deceleration or is converted to one proportional to linear velocity. The selection of the desired function will of course depend on the results of practical experience and on the availability of component parts of the apparatus. The value of the desired function can be indicated most readily by the use of a seismic mass on the wheel so that as soon as deceleration begins, the mass tends to move forward relative to the wheel with a force equal to the product of mass and deceleration and therefore proportional to deceleration. This mechanical force may be utilized in the comparison to be made as described above, or the seismic mass may be embodied in various well known types of linear decelerometers which develop electromotive forces proportional to the aforesaid mechanical force. Three types of such devices are mentioned in my prior patent, and still others are disclosed in Patents Nos. 2,494,109 and 2,552,722. In the latter case, moreover, the electromotive force may be integrated by suitable means to make it proportional to velocity instead of deceleration, in case velocity comparison is desired. Basic integrating networks utilize either series inductance or shunt capacitance according to well known principles which have been embodied in many specific integrating circuits. Electronic integrating is also known and can be employed if desired. As examples see prior Patents Nos. 2,505,549, 2,542,160, 2,652,490, 2,687,474, 2,704,326 and 2,717,310.

It has been proposed heretofore to utilize inertia effects to control wheel braking by means of an inertia member rotating with or driven from part of the wheel itself. In such cases the inertia member is usually held in a neutral position by suitable friction means, springs, etc., and operates the control only when the deceleration of the wheel increases beyond a predetermined value depending on the friction and spring setting. In other cases two or more wheels have been arranged so that one acts as a standard of reference for another, but obviously both wheels may be subject to the same adverse conditions at the same time. So far as I am aware, changes in the forward linear movement of the wheel itself furnish the only standard of reference independent of the rotary motion of the rotary body to be controlled by which the rotary performance of a wheel can be measured and controlled accurately and in terms of the ideal conditions that it is desired to maintain, i.e., that the retarding torque of braking the wheel cannot exceed the tangential force between the surface of the wheel and the surface on which it rolls by a difference sufficient to cause slippage, under all situations of weight or load on the wheels and the infinitely varying effective friction conditions between the wheel and the supporting surface.

As already indicated, the aforesaid comparison of the linear deceleration or the forward linear velocity of the wheel is to be made respectively with the corresponding function of the actual angular deceleration or velocity of the wheel to be controlled, and any difference is utilized to control the braking effect in any desired manner. If a comparison is to be made on the basis of deceleration, the function desired is the angular deceleration or rate of change of angular velocity and the wheel to be controlled can be provided with any suitable type of angular decelerometer which develops a mechanical or an electromotive force proportional to angular deceleration. Several types of electric angular decelerometers are disclosed or referred to in my aforesaid prior patent, and a suitable mechanical angular decelerometer is described hereinafter. Strain gauge as well as differential transformer type angular decelerometers are also known and can be used if desired; see for example Patents Nos. 2,453,548 and 2,638,335. Other types are disclosed in Patents Nos. 1,096,942 and 2,505,636.

Some angular decelerometers do not employ rotors which rotate continuously relative to stators, but instead two elements rotating at the same speed, one of which is capable of angular displacement relative to the other which is resisted by a spring. Hence when a change in angular velocity occurs, a relative angular displacement between the two elements takes place due to inertia forces, and this displacement can be used by a differential transformer or potentiometer to give a signal proportional to angular deceleration. Since both elements continue to revolve under all conditions, however, the signal referred to must be obtained by means of slip rings and sliding contact brushes as will be understood by those skilled in the art.

It may be preferred, however, to utilize a conventional generator driven by the wheel and developing an electromotive force proportional to the speed of rotation, and then to differentiate the electromotive force to obtain a signal proportional to deceleration. As is well known, basic differentiating networks utilize series capacitance or shunt inductance, and there are also various known electronic differentiating circuits such as that disclosed in Patent No. 2,702,855. Of course, if comparison is to be made on the basis of differences in velocity rather than differences in rates of change of velocity, a conventional generator of the type just mentioned is sufficient and differentiation is not necessary, when compared with the signal from a linear decelerometer which signal has been integrated as aforesaid.

The present invention operates on the foregoing principles of comparison, but provides novel means for effecting the comparison which makes possible the use of simpler and less complicated equipment with consequent reduction of initial cost and upkeep, with particular reference to the control of pressure-operated brakes on airplanes or other automotive vehicles. In the case of airplanes, for example, the landing roll has lengthened to the point where maximum braking is needed, yet the skid problem has become greater at the same time. In landing, wheel load conditions vary from little or no contact to full aircraft weight and the correct brake pressure varies over a correspondingly wide range. The problem is further complicated by wheel bounce, crosswind landings where one or more wheels may be off the ground for considerable distances, wet or icy runways, etc. Even under normal or ideal conditions, much less under such widely varying conditions, the wheels themselves cannot be relied upon as a reference for adequate control of the braking effect thereon for slip control, because of the basic fallacy that the braking torque to be controlled is an extraneous force affecting the controlling means.

One form of the present invention that is well adapted for use under the above conditions, and which is simple in construction and to a large extent mechanical in operation, embodies a valve in the brake pressure line and a seismic mass responsive to changes in the forward velocity of the airplane and tending to move the valve to open position in case of deceleration. Valves of this general type are known, being disclosed for example in prior Patents Nos. 2,011,243 and 2,637,273. In its simplest form, the valve stem is arranged for fore and aft movement and the mass is mounted directly thereon, but it will be understood that a pendulum or any other desired mechanical device can be employed together with suitable linkages and/or gearing. The mass itself may constitute a solenoid core, or a separate core may be mounted on the valve stem, the solenoid being energized by an electromotive force proportional to the angular deceleration of the wheel which may be produced in any of the ways mentioned above, and the solenoid tending to move the valve toward a position in which the brake pressure is relieved.

In cases where electric systems are preferable, on the other hand, a simple solenoid valve is employed in the brake pressure line, inertia effects due to the mass of the valve parts being eliminated if necessary by suitable springs or the like and/or by mounting the valve transversely of the aircraft. The solenoid is then energized or controlled with or without amplification, in response to the difference between two electromotive forces, either by bucking voltages or by differential windings as described in my prior patent. A conventional D.C. generator is driven by the wheel, and if the comparison is to be made on the basis of rates of change of velocity, its output is differentiated for comparison with the output of a linear accelerometer responsive to the deceleration of the wheel, whereas if the basis of comparison is differences of velocity, the output of the accelerometer is integrated for comparison with that of the generator.

It will be understood that where amplification of the difference in the two forces is required, it may be of any appropriate type, either electrical or by means of hydraulic servo-valves.

The various systems described generally above are illustrated by the examples shown somewhat diagrammatically in the accompanying drawings, in which—

Fig. 1 shows a system of the type having a seismic mass carried by the valve stem;

Fig. 2 shows details of a suitable wheel braking mechanism;

Fig. 3 shows a system employing a simple solenoid valve energized by the differential between bucking voltages and comparing changes in velocity;

Fig. 4 shows a system similar to Fig. 3 but employing a differentially wound relay;

Fig. 5 shows a system using the relay of Fig. 4 but making a comparison on the basis of decelerations; and Fig. 6 shows the preferred location of the linear decelerometer with respect to an airplane wheel.

Fig. 1 shows by way of example a conventional brake drum 1 of a vehicle wheel which for present purposes may be assumed to be that of an airplane, although as noted above the invention is not limited to this application. As shown, the wheel brake comprises internal expanding brake shoes 2 operated by a hydraulic brake cylinder 3, a hydraulic pressure fluid being supplied to the cylinder 3 through a pressure supply line 4. All of these parts may be of any suitable known type, and inasmuch as their operation is well understood in the art it need not be described in detail herein.

A control valve 5 is installed in the pressure line 4, this valve being of any suitable known type normally permitting the hydraulic fluid in the supply line 6 to flow through the valve to the line 4 and cylinder 3, but movable to a position in which the pressure from the line 6 is cut off while at the same time the cylinder 3 is connected with a line 7 to relieve the pressure on the brakes. For convenience, Fig. 1 shows a simple piston valve having a slidable plug 8 normally occupying the position shown in Fig. 1, further motion of the plug to the left preferably being prevented in any suitable way as by means of the stop members 9 carried by the cap 10 on the left-hand end of the valve body. In the position shown, pressure fluid from the line 6 enters the valve body through a port 11 which is in communication with an annular groove 12 surrounding the valve plug 8. On the other side of the plug, the groove 12 is in communication with a port 13 to which the line 4 is connected. When the valve plug moves to the right as hereinafter described, however, the port 11 is closed just as or slightly before the groove 12 begins to register with and open a port 14 to which the pressure relief line 7 is connected. Thus the pressure supply is cut off, but since groove 12 is still in communication with the port 13, the pressure in the brake cylinder 3 is relieved. The motion of the valve to the right may be suitably limited by stops 15 carried by the cap 16 at the right-hand end of the valve body.

In the embodiment of the invention shown in Fig. 1, the control valve is operated by the differential force obtained by comparison of a mechanical force proportional to linear deceleration and an electromotive force proportional to actual angular deceleration. This differential force may be used to move the valve piston by any suitable mechanical means which in the form shown comprise merely a valve stem 17 connected to the movable plug and extending slidably out the end of the valve body. Preferably the valve stem extends out at both ends of the valve body and inertia effects due to the mass of the valve parts are eliminated by springs 18 each connected at one end to the valve stem and at the other end to any suitable fixed part such as slide bearings 19 for the valve stem. The motion of the valve may also be damped if desired by any suitable means such as a dashpot 20 and a piston 21 on the valve stem.

The mechanical force proportional to linear deceleration is produced by a seismic mass 22 which for simplicity has been shown as formed on the valve stem itself, although as previously stated it may be a separate mass mechanically connected to the valve stem. Assuming the airplane or other vehicle to be moving to the left, then whenever deceleration begins the mass 22 tends to move the valve plug 8 to the left.

The electromotive force proportional to actual angular deceleration may be developed by an angular decelerometer of any of the types mentioned above, as indicated diagrammatically at 23. It may be preferred, however, to employ a conventional electric generator together with a differentiating circuit as described hereinafter in connection with Fig. 4. The electromotive force generated by the decelerometer 23 is supplied through leads 24 to an electromagnetic winding 25 arranged to exert an electromagnetic force on the valve stem 17 in a direction opposite to that of the mechanical force exerted by the mass 22. For simplicity, this mass itself has been shown as the armature of the electromagnet 25, but this arrangement is not necessary.

When the linear forward (i.e., leftward) motion of the wheel begins to decelerate, and assuming the ideal condition of true rolling contact with no slippage, the mass 22 tends to move the valve plug to the left with a force proportional to linear deceleration and in turn to normal rotary deceleration. On the other hand, the electromagnet 25 tends to move the valve plug to the right with a force proportional to actual angular deceleration which under ideal conditions is the same as normal rotary deceleration. These opposite forces are thus compared and can be arranged to balance out with no differential in either direction as long as ideal conditions exist. Of course, there need not be perfect balance in view of the restraining effect of the springs 18.

If slipping begins, however, the rotation of the wheel is slowed rapidly by the brake and the actual angular deceleration increases rapidly. As explained in my aforesaid patent, this can take place very quickly, and is accompanied by an immediate increase in the current through the electromagnet 25 so that a differential force is created which moves the valve plug to the right with the results already described. Release of the wheel brake will usually result in prompt reestablishment of true rolling contact; as soon as this occurs, the differential force disappears and the springs 18 return the valve piston to its normal position to reapply the brakes.

Fig. 2 illustrates a suitable mounting of a decelerometer such as 23 (or generator) on a conventional type of airplane wheel having a rim 26 for the usual tire and turning on roller bearings 27 on an axle 28. The hydraulic fluid in a radially expansible annular chamber 29 forces the brake shoe or shoes 30 outwardly into engagement with a brake drum 31 when pressure is supplied through the line 32 corresponding to the line 6 in Fig. 1. The decelerometer casing 33 may be mounted coaxially with the wheel axle 28 by suitable means such as brackets 34 secured to the end plate 35 of the axle. The rotative parts of the decelerometer may suitably be rotated by coupling bolts 36 which are secured to a spider 37 having its arms bolted at 38 to the wheel rim 26. The output leads 39 correspond to the leads 24 of Fig. 1.

It will be understood that the electric circuit 24 of Fig. 1 may be provided with any desired means known to art for preventing undesired effects due to stray currents, surges, or the like, as well as with any desired means of amplification, some of which will now be described in connection with Fig. 3. This embodiment of the invention compares two electromotive forces proportional to linear and angular velocities as described above, and the differential signal produced in case of slippage is transmitted to any suitable type of solenoid-operated valve arranged to control the brake pressure in the manner described above.

Referring now to Fig. 3, the wheel 40 is provided with a hydraulic brake operator shown diagrammatically at 41 and of any suitable type such as those illustrated in Figs. 1 and 2. A D.C. generator 42 of any suitable type rotates with the wheel 40 and develops an electromotive force proportional to the actual angular velocity of the wheel. The generator output passes through the leads 43 to a low pass filter 44 of any suitable type designed to eliminate stray currents, surge disturbances and the like.

A second electromotive force proportional to linear deceleration and hence to normal angular deceleration is developed by a suitable linear accelerometer or decelerometer 45 which is energized by any desired A.C. source 46. This decelerometer may be of the type illustrated in Fig. 5 of my aforesaid prior patent, for example, or of any other desired type. When the output of the decelerometer is A.C., as shown, it may be passed through the output leads 47 to any suitable type of rectifier 48. The varying D.C. current thus obtained is then passed through a suitable integrating circuit 49, which may be of any of the types mentioned above, to produce an electromotive force proportional to normal angular velocity for comparison with that produced by the generator 42. These parts of the circuit may be isolated by a suitable cathode follower 50 of any suitable type, and a low pass filter 51 similar to the filter 44 may also be used. Such protective means are well known in the art and hence will not be described in detail herein.

The two electromotive forces may be compared by bucking voltages as shown in Fig. 3 or by differentially wound electromagnets as shown in Figs. 4 and 5. In Fig. 3, the outputs from the two low pass filters 44 and 51 are connected together in opposition at the points 52. As long as they are equal, therefore, no current flows from the points 52 through the leads 53 to the amplifier 54, but when the actual angular deceleration exceeds the normal angular deceleration of the wheel as occurs during slippage, the actual velocity of the wheel and the corresponding generator voltage are reduced below the voltage output of the linear decelerometer. The resulting differential signal is amplified by the amplifier 54, which may be of any suitable type, and passed to a solenoid-operated valve 56 connected to the brake operator 41 by the pressure line 57. The arrangement of this valve and its operation in controlling the brake pressure can be understood from reference to the above description of Fig. 1.

Fig. 4 shows an embodiment similar to Fig. 3 except that a D.C. type of accelerometer is employed so that rectification is not necessary, and except that the comparison of the electromotive forces is made by differentially wound electromagnetic windings. In this figure the cathode follower, the filter circuits, and the amplifier have been omitted for simplicity, but it will be understood that they may be used if desired as well as any other auxiliary circuits known to those skilled in the art.

The accelerometer 60 of Fig. 4 is energized by the D.C. source 61 and may be of the type shown in Fig. 10 of my aforesaid prior patent. Its output flows through the leads 62 to an integrating circuit 63 similar to the circuit 49 of Fig. 3 to produce an electromotive force proportional to linear velocity and to normal angular velocity. The wheel 64 rotates a generator 65, which produces an electromotive force proportional to actual angular velocity of the wheel. The outputs of the integrating circuit 63 and generator 65 are conducted by leads 66 and 67 respectively to the differentially wound coils 68 and 69 of an electromagnet in which the electromotive forces are compared. Whenever a differential electromotive occurs as explained in connection with Fig. 3, therefore, the electromagnet develops a resultant magnetic field which can be used to operate a solenoid valve either directly or through any suitable means. For example, the electromagnet may close a relay switch 70 in a circuit 71 including a source of current 72 and connected to a solenoid valve 73 which controls the fluid pressure through a line 74 to a brake operator 75 on the wheel. In this case the source of current 72 provides the power for operating the valve and the differential signal need only operate the relay switch.

By replacing the integrator 63 by a differentiating circuit in the output of the generator, the system shown in Fig. 4 may be used to compare electromotive forces proportional to decelerations rather than velocities. Referring to Fig. 5, the wheel 76 and generator 77, the brake operator 78 and solenoid valve 79, and the valve operating circuit 80 including the source of current 81 and the relay switch 82 are all similar to the corresponding parts of Fig. 4. In Fig. 5, however, there is no integration of the output of the accelerometer 83 which is connected directly to the relay coil 84 by the leads 85. The output of generator 77, on the other hand, flows to a differentiating circuit 86 to provide an electromotive force proportional to actual angular deceleration rather than velocity, and the differentiating circuit is connected to the other relay coil 87. It will be seen that aside from the different bases of comparison, the systems of Figs. 4 and 5 operate in the same manner.

When any of the systems described above are to be used to control a wheel that is capable of linear movement relative to the vehicle body, the linear decelerometer as well as the angular decelerometer should preferably be movable linearly with the wheel itself in order to provide a completely accurate standard of reference. A suitable arrangement is illustrated in Fig. 6 which shows diagrammatically an airplane wheel 90 and typical undercarriage parts 91, 92 of an airplane. The accelerometer 93 is located close to and preferably in the horizontal plane of the wheel axle, extending in a fore and aft direction, and of course carried by a nonrotatable part of the undercarriage such as the strut 94. The angular decelerometer 95, as in Fig. 2, is preferably mounted to rotate coaxially with the wheel axle, and may be driven through any suitable transmission that steps up the angular velocity to any desired value. As shown, the outputs of the two decelerometers are connected at 96 to oppose each other as explained in connection with Fig. 3, and any differential electromotive force that may occur causes current to flow from the points 96 to a solenoid valve 97 also carried by the strut 94. The pressure supply and relief lines 98 and 99 respectively run down the undercarriage to the valve 97 and a pressure line 100 extends from the valve into the wheel structure for connection to the brake operator as shown in Fig. 2.

It will be understood that the term "acceleration" includes both positive and negative accelerations and that the term "deceleration" is equivalent to a negative acceleration. The terms "accelerometer" and "decelerometer" thus include devices responding to either positive or negative accelerations.

While the embodiments of the invention illustrated on the accompanying drawings have been described with considerable particularity, it will be understood that the invention is not limited to these embodiments but is susceptible of a variety of expressions or forms which will suggest themselves to those skilled in the art. Further while the invention has been particularly illustrated and described with reference to the control of brakes on airplane landing wheels, it is not limited to this use but is equally applicable to other wheeled vehicles such as trucks, railway cars, automobiles, etc. Still further, while certain devices have been described in detail, particularly various types of linear and angular decelerometers, it is to be understood that any other known devices of these types can be employed, and that the elements illustrated may be replaced by equivalent elements and various other changes may be made in the details of construction and arrangement of the parts, without departing from the spirit of the invention.

For defining the present invention reference is therefore to be had to the appended claims wherein the deceleration corresponding to true rolling, with no slippage, will be identified as the linear or normal angular deceleration, for comparison with the actual angular deceleration of the wheel at any instant, the two being the same when slippage is absent, but immediately providing a differential as soon as slippage starts, release of the brake being made to depend only on the existence of such a differential from whatever cause or causes, followed by reapplication of the brake upon disappearance of said differential. It is also to be understood that said differential may be considered zero as a practical matter, although not mathematically so, until a resultant differential of sufficient magnitude in the sources of energy is generated to close a relay, operate a thermionic valve, actuate a solenoid or other electromagnetic actuator, or otherwise control the pressure of fluid in the brake cylinder for determining the application or release of the brake.

What is claimed is:

1. In a braking system for a wheeled vehicle having a pressure-operated wheel brake, the combination of a valve in the brake pressure line movable to an open position in which pressure may be applied to the brake and a closed position in which the pressure is cut off and the brake pressure released, means responsive to changes in the linear velocity of the wheel for generating an electromotive force proportional to the linear deceleration of said wheel, a generator driven by said wheel having an output proportional to the angular velocity of said wheel, a differentiating circuit for the generator output, relay means for opposing said electromotive force to the output of said differentiating circuit to obtain a differential electromotive force proportional to differences between the normal angular velocity and the actual angular velocity of the wheel, and valve-actuating means energized by said differential force for moving said valve to closed position.

2. In a pressure braking system for the landing wheels of an airplane in which the wheels and brakes are mounted so as to be capable of linear displacement relative to the body of the airplane on landing, the combination of a valve in the pressure line to the brake and movable to different positions for applying pressure to the brake and for relieving the pressure applied to the brake, means for generating an electromotive force proportional to the linear deceleration of a wheel comprising a linear decelerometer having a seismic mass carried by the wheel and mounted for fore and aft movement approximately in the horizontal plane of the wheel axis, a generator driven by said wheel having an output electromotive force proportional to the angular velocity of the wheel, converting means comprising an integrating circuit for converting said electromotive forces from said linear decelerometer to an electromotive force proportional to the same function of wheel rotation as the unconverted electromotive force, means for opposing said converted and unconverted electromotive forces and obtaining a differential force therefrom, and means actuated by said differential force when the wheel brakes cause slippage between the wheels and the landing surface for moving said valve to said pressure relieving position.

3. In a pressure braking system for the landing wheels of an airplane in which the wheels and brakes are mounted so as to be capable of linear displacement relative to the body of the airplane on landing, the combination of a valve in the pressure line to the brake and movable to different positions for applying pressure to the brake and for relieving the pressure applied to the brake, means for generating an electromotive force proportional to the linear deceleration of a wheel comprising a linear decelerometer having a seismic mass carried by the wheel and mounted for fore and aft movement approximately in the horizontal plane of the wheel axis, a generator driven by said wheel having an output electromotive force proportional to the angular velocity of the wheel, converting means comprising a differentiating circuit for converting said electromotive forces from said generator to an electromotive force proportional to the same function of wheel rotation as the unconverted electromotive force, means for opposing said converted and unconverted electromotive forces and obtaining a differential force therefrom, and means actuated by said differential force when the wheel brakes cause slippage between the wheels and the landing surface for moving said valve to said pressure relieving position.

References Cited in the file of this patent

UNITED STATES PATENTS

| Number | Name | Date |
|---|---|---|
| 1,096,942 | Owens | May 19, 1914 |
| 2,251,973 | Beale et al. | Aug. 12, 1941 |
| 2,308,878 | Hines et al. | Jan. 19, 1943 |
| 2,431,445 | Anderson | Nov. 25, 1947 |
| 2,515,729 | Morrison | July 18, 1950 |
| 2,529,985 | Williams | Nov. 14, 1950 |
| 2,613,071 | Hansel | Oct. 7, 1952 |
| 2,704,326 | Whitson et al. | Mar. 15, 1955 |
| 2,799,462 | Steigerwald | July 16, 1957 |

FOREIGN PATENTS

| Number | Country | Date |
|---|---|---|
| 202,892 | Germany | Oct. 10, 1908 |